(12) United States Patent
Sankai (10) Patent No.: US 12,472,402 B2
(45) Date of Patent: Nov. 18, 2025

(54) HEART REHABILITATION SUPPORT APPARATUS AND HEART REHABILITATION SUPPORT METHOD

(71) Applicant: CYBERDYNE INC., Tsukuba (JP)

(72) Inventor: Yoshiyuki Sankai, Tsukuba (JP)

(73) Assignee: CYBERDYNE INC., Tsukuba (JP)

( * ) Notice: Subject to any disclaimer, the term of this patent is extended or adjusted under 35 U.S.C. 154(b) by 546 days.

(21) Appl. No.: 17/425,537

(22) PCT Filed: Jan. 30, 2020

(86) PCT No.: PCT/JP2020/003561
§ 371 (c)(1),
(2) Date: Jul. 23, 2021

(87) PCT Pub. No.: WO2020/158904
PCT Pub. Date: Aug. 6, 2020

(65) Prior Publication Data
US 2022/0118315 A1   Apr. 21, 2022

(30) Foreign Application Priority Data

Jan. 30, 2019   (JP) ................... 2019-014243

(51) Int. Cl.
*A63B 24/00* (2006.01)
*A63B 22/00* (2006.01)
(Continued)

(52) U.S. Cl.
CPC .......... *A63B 24/0087* (2013.01); *A63B 22/06* (2013.01); *A63B 24/0062* (2013.01);
(Continued)

(58) Field of Classification Search
None
See application file for complete search history.

(56) References Cited

U.S. PATENT DOCUMENTS

| 4,463,764 | A | * | 8/1984 | Anderson | .............. G16H 15/00 |
|---|---|---|---|---|---|
| | | | | | 600/538 |
| 2005/0140113 | A1 | * | 6/2005 | Kokatsu | ............. A63B 22/0605 |
| | | | | | 280/205 |

(Continued)

FOREIGN PATENT DOCUMENTS

| GB | 2450785 A | | 1/2009 | |
|---|---|---|---|---|
| GB | 2485216 A | * | 5/2012 | .............. B62M 6/45 |

(Continued)

OTHER PUBLICATIONS

International Search Report, PCT/JP2020/003561, Apr. 7, 2020, 5 pgs.

(Continued)

*Primary Examiner* — Shila Jalalzadeh Abyaneh
(74) *Attorney, Agent, or Firm* — Volpe Koenig (57) ABSTRACT

When controlling load torque of a drive unit on the basis of a biological signal detected from a subject's lower limb parts, adjustments are made to a hybrid ratio of voluntary control to generate running torque and a rotational speed of a crank according to the subject's intention and autonomous control to generate assisting power for the subject's pedaling motion on the basis of a rotation angle of the crank.

10 Claims, 5 Drawing Sheets

(51) Int. Cl.
 *A63B 22/06* (2006.01)
 *G16H 20/30* (2018.01)
(52) U.S. Cl.
 CPC ...... *G16H 20/30* (2018.01); *A63B 2022/0094* (2013.01); *A63B 2024/0093* (2013.01); *A63B 2230/045* (2013.01); *A63B 2230/208* (2013.01); *A63B 2230/405* (2013.01)

(56) References Cited

U.S. PATENT DOCUMENTS

| | | | | |
|---|---|---|---|---|
| 2006/0211956 | A1* | 9/2006 | Sankai | A61F 5/0102 601/5 |
| 2008/0161937 | A1* | 7/2008 | Sankai | A61H 1/0255 623/25 |
| 2008/0234608 | A1* | 9/2008 | Sankai | A61H 1/0262 601/5 |
| 2009/0009284 | A1 | 1/2009 | Sako | |
| 2009/0137366 | A1* | 5/2009 | Hirata | A61B 5/02438 482/8 |
| 2011/0082397 | A1* | 4/2011 | Alberts | A61H 1/02 482/8 |
| 2011/0294624 | A1* | 12/2011 | Burnfield | A63B 21/00181 482/145 |
| 2014/0058299 | A1* | 2/2014 | Sankai | A61H 1/0244 601/35 |
| 2014/0113768 | A1* | 4/2014 | Lin | A63B 71/0619 482/5 |
| 2014/0276262 | A1 | 9/2014 | Kare et al. | |
| 2016/0023081 | A1* | 1/2016 | Popa-Simil | B62J 45/412 700/91 |
| 2017/0127962 | A1* | 5/2017 | Sankai | G08C 19/00 |
| 2018/0235479 | A1 | 8/2018 | Mizukura et al. | |
| 2019/0017007 | A1* | 1/2019 | Sankai | A61B 5/1105 |

FOREIGN PATENT DOCUMENTS

| | | |
|---|---|---|
| JP | 2016-022112 A | 2/2016 |
| JP | 2016-158711 A | 9/2016 |
| JP | 2018-134294 A | 8/2018 |

OTHER PUBLICATIONS

Extended European Search Report issued on Sep. 9, 2022 for European Patent Application No. 20749386.7.

* cited by examiner

HEART REHABILITATION SUPPORT APPARATUS AND HEART REHABILITATION SUPPORT METHOD

TECHNICAL FIELD

The present invention relates to a heart rehabilitation support technology for supporting functional recovery of a subject's heart after a cardiovascular disease treatment.

BACKGROUND ART

Heart rehabilitation is defined as multi-aspect intervention that is aimed at recovering and maintaining a heart disease patient's optimum physical, mental, and social conditions, suppressing the progress of underlying arteriosclerosis, and further reducing a morbidity rate and a death rate.

The purposes of such heart rehabilitation are to: firstly correct physical and mental deconditioning (increase exercise tolerability); secondly implement coronary risk factor correction and secondary prevention (long-term prognosis improvement); and thirdly achieve social life support of good quality and enhance QOL (Quality of Life) (comfortable life). In order to achieve these purposes, an interprofessional collaboration team performs exercise therapy, patient education, and counseling on the basis of medical evaluation.

As the heart rehabilitation by the exercise therapy, there has been conventionally proposed a monitoring system for gradually imparting a load to a circulatory system under monitor surveillance by using, for example, a treadmill or a bicycle ergometer.

As a conventional technology, there has been proposed a heart rehabilitation support information system for reducing human medical resources by measuring an electrocardiogram of a subject after an acute heart disease event treatment, analyzing a cardiac voltage, and creating exercise amount information (see PTL 1).

Moreover, there is proposed an exercise load test system designed so that when a subject pedals an ergometer, swaying of the subject's body is hardly directly transmitted to an electrocardiogram measurement input box which is attached to a lumbar part (see PTL 2).

Furthermore, there is proposed an exercise therapy apparatus for stably calculating an AT (Anaerobic Threshold: anaerobic threshold or anaerobic metabolism threshold) which is an index for exercise tolerability, when the subject undergoes an exercise load test which also uses inhaled gas analysis by using an ergometer (see PTL 3).

CITATION LIST

Patent Literature

PTL 1: Japanese Patent Application Laid-Open (Kokai) Publication No. 2016-158711
PTL 2: Japanese Unexamined Patent Application Publication (Translation of PCT Application) No. 2016-22112
PTL 3: Japanese Unexamined Patent Application Publication (Translation of PCT Application) No. 2018-134294

SUMMARY OF THE INVENTION

Problems to be Solved by the Invention

Meanwhile, the heart rehabilitation by gradually imparting the load to the circulatory system by using the ergometer has not been sufficient enough to achieve the functional recovery of the heart in a natural state even under monitor surveillance without imposing an excessive load on the heart by reflecting the subject's intention as much as possible while the subject is pedaling the ergometer.

The aforementioned PTL 1 judges the subject's heart moving state on the basis of electrocardiac information and exercise amount information; however, it only judges the subject's heart moving state, while monitoring whether too much load is being imposed on the heart or not, merely from the subject's behavior history and heart condition.

Moreover, the aforementioned PTL 2 is designed to measure the electrocardiogram of the subject while having the exercise load by using the ergometer; however, the input box is just provided on the ergometer's side wirelessly from the subject's body in order to avoid noise superposition within the input box and enhance the waveform quality of electrocardiogram waveforms.

Furthermore, the aforementioned PTL 3 is only designed to estimate an oxygen intake amount per minute and a carbon dioxide emission per minute during a lamp load period after the elapse of a warming-up period in order to calculate the stable anaerobic threshold ($\Delta T$) regardless of the subject.

Specifically speaking, according to the descriptions of the aforementioned PTL 1 to PTL 3, they are not sufficient for the practical use in order to perform the heart rehabilitation with a sense of security while pedaling and reflecting the subject's own intention as much as possible without becoming conscious of their own heart condition.

The present invention was devised in consideration of the above-described circumstances and proposes a heart rehabilitation support apparatus and heart rehabilitation support method capable of performing exercise for functional recovery of a heart by maintaining the load imposed on the subject's heart always in an optimum state.

Means to Solve the Problems

In order to solve the above-described problems, there is provided according to the present invention is a heart rehabilitation support apparatus for supporting functional recovery of a heart of a subject after a cardiovascular disease treatment by using an instrument for imparting an arbitrary exercise load according to a pedaling motion of the subject in a seated state, wherein the heart rehabilitation support apparatus includes: a drive unit that imparts load torque as the exercise load upon rotation of a crank to which pedals to be pushed by the subject is attached in the instrument; a biological signal detection unit that detects a biological signal from lower limb parts of the subject; a voluntary control unit that performs voluntary control of the load torque of the drive unit so as to generate running torque and a rotational speed according to an intention of the subject on the basis of the biological signal detected by the biological signal detection unit; an autonomous control unit that performs autonomous control of the load torque of the drive unit so as to generate assisting power for the pedaling motion of the subject on the basis of a rotation angle of the crank; a cardiac condition detection unit that detects a heart rate and an electrocardiogram change of the subject; an arterial blood measurement unit that measures a pulse rate and a blood oxygen saturation degree of the subject; and an optimum torque adjustment unit that adjusts a hybrid ratio of the voluntary control by the voluntary control unit and the autonomous control by the autonomous control unit on the basis of detection and measurement results by the cardiac condition detection unit and the arterial blood measurement unit.

As a result, the heart rehabilitation support apparatus can perform the exercise for the functional recovery of the heart while always adjusting the exercise load in the optimum state according to the subject's heart condition without letting the subject excessively increase the exercise load according to the pedaling motion of the instrument.

Also, the present invention further includes an exhalation detection unit that detects a concentration of carbon dioxides contained in an exhaled gas of the subject, wherein the optimum torque adjustment unit adjusts the hybrid ratio of the voluntary control by the voluntary control unit and the autonomous control by the autonomous control unit on the basis of detection and measurement results by the cardiac condition detection unit, the arterial blood measurement unit, and the exhalation detection unit.

Accordingly, the heart rehabilitation support apparatus can adjust the hybrid ratio of the voluntary control and the autonomous control on the basis of a combination of the detection results of the subject's heart rate and electrocardiogram change and the measurement results of the subject's pulse rate and blood oxygen saturation degree by judging the degree of exercise intensity according to the anaerobic metabolism threshold of the subject on the basis of the detection result of the concentration of the carbon dioxides contained in the subject's exhaled gas.

Furthermore, according to the present invention, the voluntary control unit and the autonomous control unit are designed to respectively control the load torque of the drive unit so that the heart rate of the subject is always maintained within an appropriate range. Specially speaking, the heart rehabilitation support apparatus performs the control: to decrease the pedal rotation frequency at the same time as increasing the load torque of the drive unit when the subject's own heart rate is about to exceed the appropriate range while the subject is performing the pedaling motion; and on the other hand, to increase the crank rotational frequency at the same time as decreasing the load torque of the drive unit when the subject's heart rate is about to fall below the appropriate range. As a result, the subject can perform the exercise for the functional recovery of their heart unconsciously without letting their heart rate excessively increase or decrease.

Furthermore, the present invention further includes a synchronous video display unit that is provided within a field of vision of the subject in the seated state at the instrument and displays a video which changes in synchronization with the pedaling motion of the subject. As a result, with the heart rehabilitation support apparatus, the subject can continuously perform the exercise for the functional recovery of their heart in a positive mood (by recognizing a sense of accomplishment) while experiencing, through a visual check, an exercise amount (a state of progress) by the pedaling motion.

Advantageous Effects of the Invention

The present invention as described above can implement the heart rehabilitation support apparatus and the heart rehabilitation support method capable of performing the exercise for the functional recovery of the heart by maintaining the load imposed on the subject's heart always in an optimum state.

DESCRIPTION OF EMBODIMENTS

An embodiment of the present invention will be explained below in detail with reference to the drawings.

Figure 1:
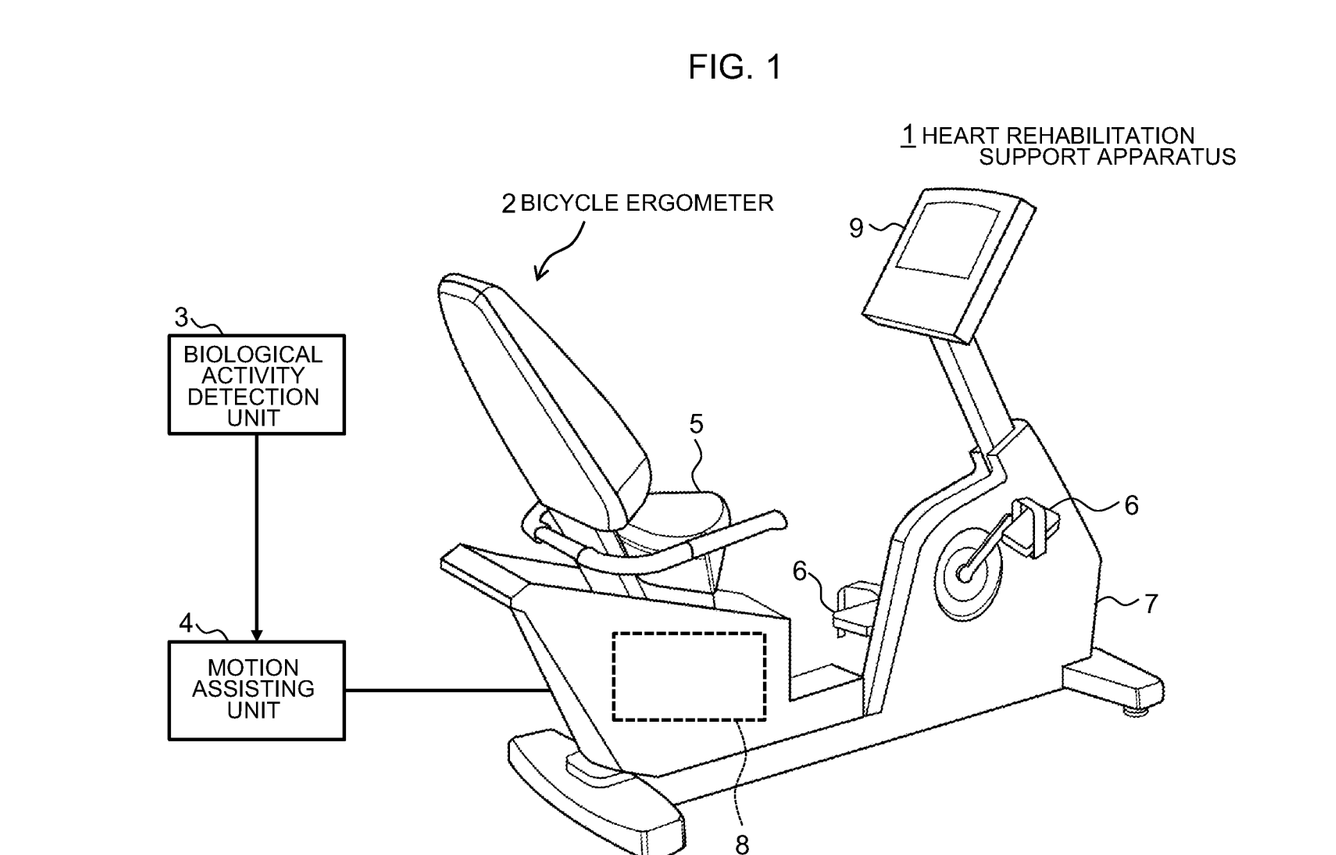
FIG. 1 is a schematic diagram illustrating an overall configuration of a heart rehabilitation support apparatus according to this embodiment.

(1) Configuration of Heart Rehabilitation Support Apparatus According to this Embodiment FIG. 1 illustrates a heart rehabilitation support apparatus 1 as a whole according to this embodiment and the heart rehabilitation support apparatus 1 is designed to support functional recovery of a subject's heart after a cardiovascular disease treatment by using a recumbent-type bicycle ergometer 2 which imparts an arbitrary exercise load according to a pedaling motion of a subject in a seated state, a biological activity detection unit 3 which detects the subject's biological activities, and a motion assisting unit 4 which assists the subject's pedaling motion.

The bicycle ergometer 2 includes: a saddle part 5 for the subject to be seated on, pedals 6 for pedaling by the subject; a crank 7 to which the pedals are attached; a drive unit 8 that imparts load torque as the exercise load upon rotations of the crank 7 according to the subject's pedaling motion; and a display unit 9 that displays the exercise load and exercise time as well as a rotation position and rotational speed of the crank 7.

Figure 2:
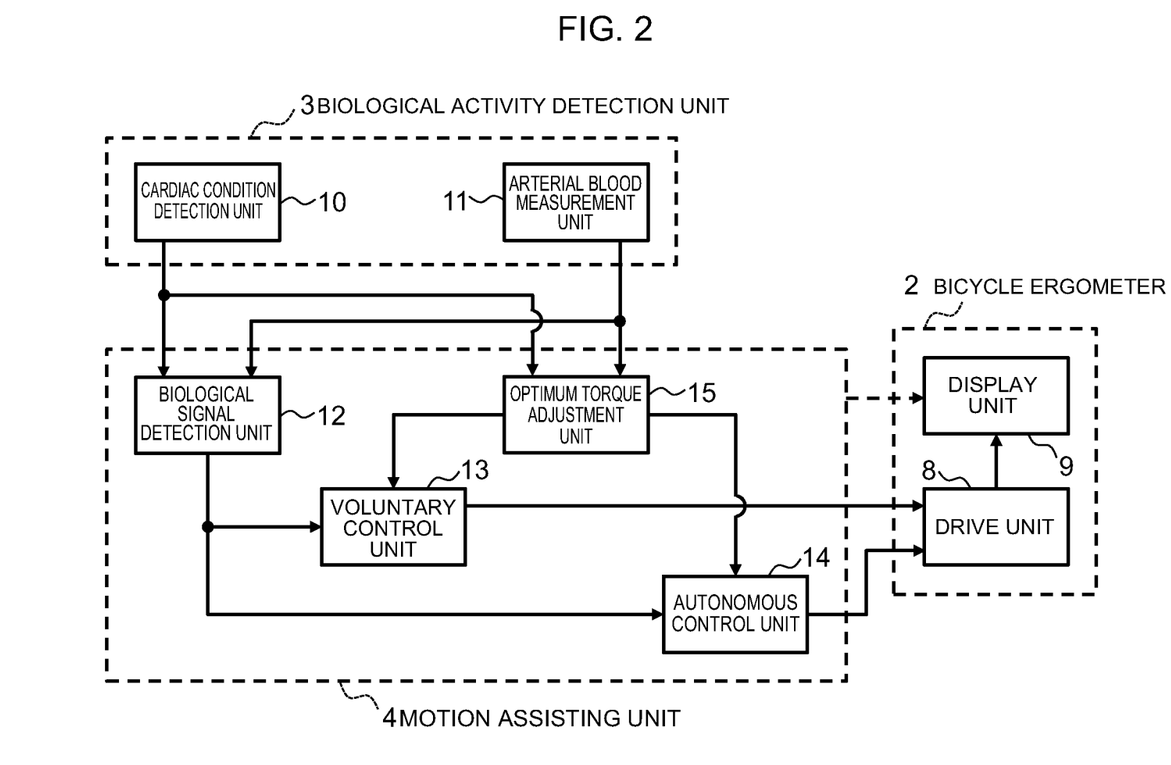
FIG. 2 is a block diagram illustrating the configuration of a biological activity detection unit and a motion assisting unit.

The biological activity detection unit 3 includes, as illustrated in FIG. 2, a cardiac condition detection unit 10 that detects the subject's heart rate and electrocardiogram changes, and an arterial blood measurement unit 11 that measures the subject's pulse rate and blood oxygen saturation degree.

The motion assisting unit 4 includes: a biological signal detection unit 12 that detects a biological signal from the subject's lower limb parts; a voluntary control unit 13 that performs voluntary control of the load torque of the drive unit 8 for the bicycle ergometer 2 so as to generate running torque and a rotational speed of the crank 7 according to the subject's intention on the basis of the biological signal detected by the biological signal detection unit 12; an autonomous control unit 14 that performs autonomous control of the load torque of the drive unit 8 so as to generate assisting power for the subject's pedaling motion on the basis of a rotation angle of the crank 7; and an optimum torque adjustment unit 15 that adjusts a hybrid ratio of the voluntary control by the voluntary control unit 13 and the autonomous control by the autonomous control unit 14 on the basis of the detection and measurement results by the cardiac condition detection unit 10 and the arterial blood measurement unit 11 for the biological activity detection unit 3.

Furthermore, the display unit (synchronous video display unit) 9 for the bicycle ergometer 2 is provided within a field of vision of the subject in a state of being seated on the bicycle ergometer 2 and is designed to display a video which changes in synchronization with the pedaling motion of the subject in accordance with the control by the motion assisting unit 4.

Consequently, the subject can continuously perform the exercise for the functional recovery of their heart in a positive mood (by recognizing a sense of accomplishment) while experiencing, through a visual check, an exercise amount (a state of progress) by the pedaling motion.

(2) Control System for Motion Assisting Unit

A control system for the motion assisting unit 4 according to this embodiment is designed in the same manner as, and uses the same principle as, that of the content described in J.P. Patent Registration No. 4178187 by the inventor of the present application.

Figure 3:
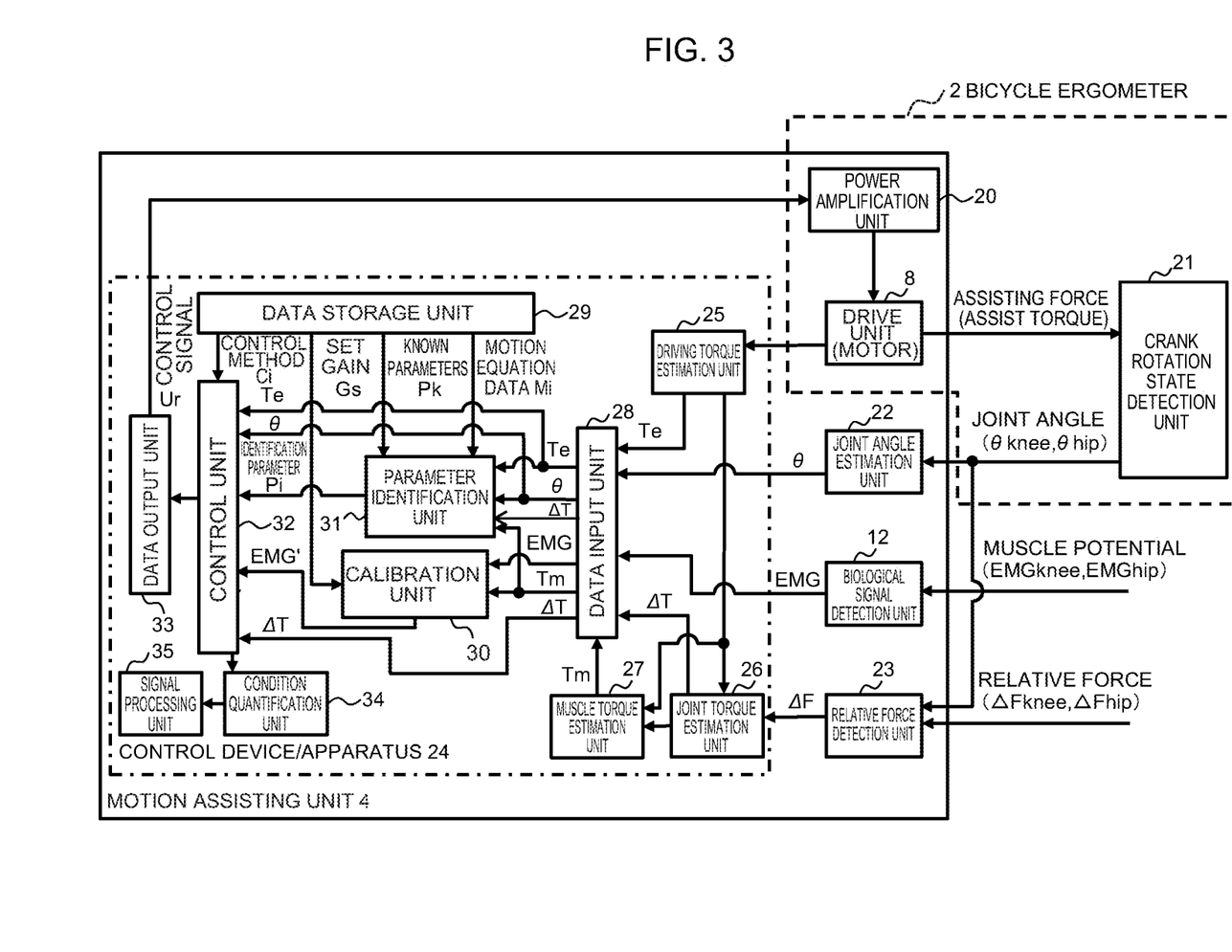
FIG. 3 is a block diagram illustrating an internal configuration of the motion assisting unit.

In the heart rehabilitation support apparatus 1, the bicycle ergometer 2 includes, as illustrated in FIG. 3: a drive unit 8 (FIG. 1) that imparts an assisting force to the subject (the force to generate the running torque which acts on the crank 7); a power amplification unit 20 that drives the drive unit 8; and a crank rotation state detection unit 21 that detects the running torque, the rotational speed, and the rotation angle of the crank 7.

The motion assisting unit 4 includes: a joint angle estimation unit 22 that estimates an angular displacement 8 of each joint of the subject (corresponding to each of a knee joint and a hip joint) on the basis of the rotation angle of the crank 7; a biological signal detection unit 12 (FIG. 1) that detects a muscle potential (biological signal) according to muscle strength generated by the subject; and a relative force detection unit 23 that detects a relative force ($\Delta F$) which acts on the motion assisting unit 4, that is, a force which is relatively defined by the relation between the force generated by the drive unit 8 and the subject's muscle strength.

The motion assisting unit 4 in this embodiment controls the assisting force by using a bio-electrical signal (BES: Bio-Electrical Signal) that is a command signal as a biological signal from an upper central nervous system, which is generated in the form of an electric potential on a muscle surface via a spinal cord.

Furthermore, the motion assisting unit 4 includes a control apparatus 24 that controls driving of the drive unit 8 through the power amplification unit 20. The control apparatus 24 includes a driving torque estimation unit 25, a joint torque estimation unit 26, a muscle torque estimation unit 27, a data input unit 28, a data storage unit 29, a calibration unit 30, a parameter identification unit 31, a control unit (including the voluntary control unit 13, the autonomous control unit 14, and the optimum torque adjustment unit 15 mentioned earlier) 32, a data output unit 33, a condition quantification unit 34, and a signal processing unit 35.

The driving torque estimation unit 25 estimates driving torque (Te), also referred to herein as driving torque estimation data and driving torque estimated value, generated by the drive unit 8. For example, it is possible to apply a device which estimates the driving torque (Te) by detecting an electric current value supplied to the drive unit 8 and multiplying this electric current value by a torque constant specific to the drive unit 8.

The joint torque estimation unit 26 estimates a joint moment ($\Delta T$) around each joint of the subject from the difference between a value obtained by multiplying relative force data ($\Delta F$) detected by the relative force detection unit 23 by a preset constant and the driving torque estimation data (Te). Since a resultant force of the driving torque (Te) of the drive unit 8 and muscle torque (Tm) of the subject acts as a joint moment ($\Delta T$) on the subject's legs, it enables the subject to move their legs with smaller muscle strength than the case where the subject does not perform the pedaling motion.

The muscle torque estimation unit 27 estimates the muscle torque (Tm) by the subject's muscle strength on the basis of the driving torque estimation data (Te) estimated by the driving torque estimation unit 25 and the joint moment estimation data ($\Delta T$) which is estimated by the joint torque estimation unit 26. Incidentally, the muscle torque (Tm) is found in order to enable parameter identification even under the circumstance where the subject generates the muscle strength; and it is advantageous for the case where the parameter identification is performed when the subject is in a motion state.

The data input unit 28 is an input interface for detection data from the various kinds of detection units for the motion assisting unit 4 and estimation data from the various kinds of estimation units. The data storage unit 29 stores data which are required for various kinds of arithmetic processing by the control apparatus 24.

The parameter identification unit 31 is configured so that: a target motion equation is configured in a computing environment by using a motion equation (Mi) and known dynamics parameters (Pk) which are read from the data storage unit 29; and a driving torque estimated value (Te), a joint torque estimated value ($\Delta T$), and a joint angle $\theta$ from the data input unit 28 can be applied to that motion equation.

Under this circumstance, the motion equation (Mi) is to configure a motion equation of the entire system composed of the motion assisting unit 4 and the subject; and on the other hand, the known dynamics parameters (Pk) are composed of dynamics parameters such as weights of the respective parts of the motion assisting unit 4, moment of inertia around the joints, a viscosity coefficient, and a Coulomb's friction coefficient.

The parameter identification unit 31: executes the arithmetic processing in consideration of driving torque estimation data (Te), joint data ($\theta$) and joint moment data ($\Delta T$), and further the muscle torque (Tm) which have been read; identifies unknown dynamics parameters (Pu) such as the weights of the respective parts of the subject, the moment of inertia around each joint, the viscosity coefficient, and the Coulomb's friction coefficient; and repeats the identification a plurality of number of times (for example, 10 times), averages the parameters to create an identified dynamics parameter (Pi), and sends the identified dynamics parameter (Pi), to the control unit 32.

The calibration unit 30 reads a ratio (Tm/EMG) of the estimated muscle torque (Tm) to a muscle potential (EMG) from the data input unit 28 and a specified set gain (Gs) from the data storage unit 29; and if the set gain (Gs) is outside a permissible error range (Ea), the calibration unit 30 calculates corrected muscle potential data (EMG') by correcting the muscle potential data (EMG) and thereby causes a ratio (Tm/EMG') of the muscle torque (Tm) to the corrected muscle potential (EMG') to become substantially equal to the set gain (Gs).

As a result, it is possible to prevent the situation where identification accuracy of the subject's unknown dynamics parameters (Pu) may degrade. Further, it is also possible to prevent the situation where the assisting force generated by the drive unit 8 may become excessively small or excessively large.

The control unit 32 is configured to be capable of reading control method data (Ci) from the data storage unit 29, the driving torque estimated value (Te), the joint torque estimated value ($\Delta$T), and the joint angle $\theta$ from the data input unit 28, the identified dynamics parameter (Pi) from the parameter identification unit 31, and the corrected muscle potential (EMG') from the calibration unit 30.

Furthermore, the control unit 32 configures a specified control means in the computing environment by using the control method data (Ci) and reflects the driving torque estimated value (Te), the joint torque estimated value ($\Delta$T), the joint angle $\theta$, the identified dynamics parameter (Pi), and the muscle potential (EMG') in this control means, thereby making it possible to send out a control signal (Ur) for controlling driving of the drive unit 8.

The data output unit 33 is an output interface for transmitting the control signal (Ur) from the control unit 32 to the power amplification unit 20. The power amplification unit 20 is to drive the drive unit 8 according to the control signal (Ur) from the data output unit 28.

Furthermore, the motion assisting unit 4 is designed to control the assisting force based on impedance adjustments so as to solve natural control hindrances attributable to restrictions by physical properties of the apparatus itself, that is, viscoelasticity around the joints and the inertia of the crank 7. Specifically speaking, the motion assisting unit 4 enhances an assisting rate for the waling motion and reduces a sense of discomfort felt by the subject by calculating parameters for the joints and compensating for the moment of inertia, the viscosity, and the elasticity by using an actuator of the drive unit 8.

Consequently, the motion assisting unit 4 can indirectly change and adjust properties of the subject by changing properties of the entire system which is constituted by the unit itself plus the subject. For example, it becomes possible to demonstrate the ability, which the subject originally has, to perform agile motions such as reflexes to the maximum extent by adjusting the driving torque so that any influence by inertia terms and viscous friction terms of the entire system can be suppressed. Furthermore, it is also possible to suppress any influence by inertia terms and viscous friction terms of the subject themselves and cause the subject to walk faster than their original cycle and perform motions more smoothly (with less viscous frictions) than before wearing the unit.

Furthermore, the motion assisting unit 4 in a state attached to the subject can cause the parameter identification unit 31 to identify the unknown dynamics parameters (Pu) specific to the subject to create the identified dynamics parameter (Pi) and cause the control apparatus 24 to control the drive unit 8 on the basis of the motion equation to which the identified dynamics parameter (Pi) are applied. Thus, it is possible to exhibit the advantageous effects according to the control method used by the control apparatus 24 regardless of variation factors such as individual differences between subjects and the relevant subject's physical condition.

Furthermore, since the drive unit 8 can be controlled by the control apparatus 24 on the basis of the motion equation to which the muscle torque (Tm) estimated by the muscle torque estimation unit 27 is also applied, the unknown dynamics parameters (Pu)_can be identified even in the state where the muscle strength is generated from the subject; and the above-described advantageous effects can be exhibited without requiring the subject wait during waiting time to identify the unknown dynamics parameters (Pu).

Since the calibration unit 30 which adjusts a mutual gain between the muscle potential (EMG) detected by the biological signal detection unit 12 and the muscle torque (Tm) detected by the muscle torque estimation unit 27 so that the mutual gain becomes the set gain (Gs) which is previously set, it is possible to prevent the situation where poor sensitivity or excessive sensitivity may occur in the detection result from the biological signal detection unit 12.

As a result, it is possible to prevent the situation where the identification accuracy of the subject's unknown dynamics parameters (Pu) may degrade; and it is also possible to prevent the situation where the assisting force generated by the drive unit 8 may become excessively small or excessively large. Additionally, the motion assisting unit 4 in this embodiment: can perform calibration even in the state where the muscle strength is generated from the subject; and does not require the subject to wait during the waiting time to perform the calibration.

Since at least either one of gravity compensation and inertia compensation which use the identified dynamics parameter (Pi) identified by the parameter identification unit 31 can be applied to the control apparatus 24, it is possible to prevent the situation where the weight of the apparatus itself may become a burden on the subject. Additionally, it is possible to prevent the inertia of the apparatus itself from giving a sense of discomfort to the subject when the apparatus operates.

The condition quantification unit 34 for the control apparatus 24 converts an activity state of the musculoskeletal system and a transmission state of the peripheral nervous system around the joints to quantitative musculoskeletal system data and nervous system data on the basis of a muscle potential signal and a neural transmission signal as well as physical quantities around the joints which are supplied from the control unit 32.

The physical quantities around the joints include, for example: results of the parameter identification of at least one or more of the muscle strength which occur at muscles and skeleton, an articular range of motion, movable speed, and reaction rate of each joint, autonomous control properties with respect to disturbances, and the moment of inertia, mass, and center of gravity of the crank; impedance adjustment results (viscous property by frictions) of the joint system including flexor muscles and extensor muscles; and electric physical quantity (command signal).

The signal processing unit 35 has a wireless communication function and transmits the musculoskeletal system data and the nervous system data, which are supplied from the control unit 32, to a data terminal device (which is not illustrated in the drawing) via a communication network. With the data terminal device, the musculoskeletal system data and the nervous system data are integrally managed with respect to each subject by an administrative server and are designed to be used for medical treatments and treatment methods.

Accordingly, the drive unit 8 imparts the driving force to assist the subject's voluntary motions and the driven state of the drive unit 8 is reflected in the musculoskeletal system data and the nervous system data, so that it becomes possible, on the basis of the above-reflected results, to quantitatively evaluate to what degree the voluntary control will influence an active state of the subject's musculoskeletal system and a connection state of the subject's central nervous system and peripheral nervous system.

Incidentally, the control unit 32 performs voluntary control of the load torque of the drive unit 8 for the bicycle ergometer 2 to generate the running torque and the rotational speed of the crank 7 according to the subject's intention and performs autonomous control of the load torque of the drive unit 8 for the bicycle ergometer 2 to generate the assisting power for the subject's pedaling motion as described later. Then, the control unit 32 is designed to control the pedaling motion by adjusting the hybrid ratio of the voluntary control and the autonomous control on the basis of the outputs from the biological activity detection unit 3 so as to not increase the subject's exercise load excessively.

(3) Configuration of Biological Activity Detection Unit

Figure 4:
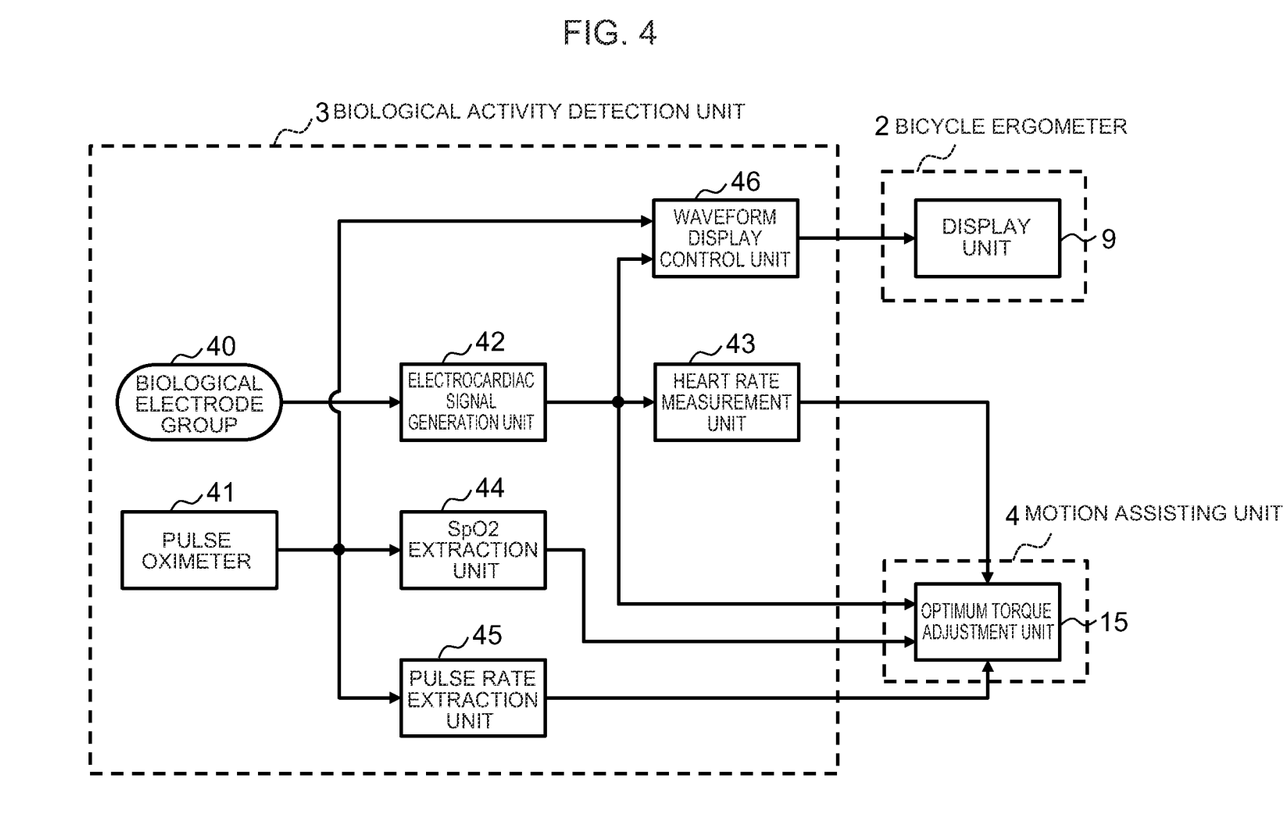
FIG. 4 is a block diagram illustrating the configuration of a biological activity detection unit according to this embodiment.

The biological activity detection unit 3 includes, as means for detecting the subject's biological information as illustrated in FIG. 4, a plurality of biological electrode groups 40 as an electrocardiogram sensor and a respiratory sensor, and a pulse oximeter 41 as an SpO2 sensor. The plurality of biological electrode groups 40 are attached to the subject's right and left wrists, left ankle, and precordial region and electromotive forces of the subject's heart at these attached regions are input as electric signals to the electrocardiac signal generation unit 42.

The pulse oximeter 41: emits red light and/or infrared light, lets them transmit through a patient's specified region (such as a fingertip or a toe), and finds a ratio of oxygenated hemoglobin to total hemoglobin in arterial blood on the basis of the transmitted light (reflected light); and measures arterial oxygen saturation (SpO2 value) and a pulse rate by detecting changes in absorbance in synchronization with pulses of the arterial blood.

The heart rate measurement unit 43 identifies the position of a QRS wave in the subject's electrocardiogram according to the electrocardiac signal obtained from the electrocardiac signal generation unit 42 and calculates an average value of a heart beat interval (R-R interval) of the subject in immediate several seconds on the basis of the position of the identified QRS wave. Then, the heart rate measurement unit 43 calculates the subject's heart rate on the basis of the average value of the heart beat interval (R-R interval) and generates data indicating the heart rate.

The SpO2 extraction unit 44 extracts data indicating the measurement result of the arterial oxygen saturation on the basis of outputs from the pulse oximeter 41. The pulse rate extraction unit 45 extracts data indicating the pulse rate on the basis of the outputs from the pulse oximeter 41.

The waveform display control unit 46: obtains waveform information representing the subject's electrocardiographic waveform and SpO2 waveform by applying specified display processing including synchronization processing to an electrocardiac signal, which is input from the electrocardiac signal generation unit 42, and an output signal which is input from the pulse oximeter 41; and outputs the waveform information to the display unit 9 for the bicycle ergometer 2.

Accordingly, the biological activity detection unit 3 inputs the subject's heart rate and electrocardiogram changes, which are obtained from the electrocardiac signal generation unit 42 and the heart rate measurement unit 43 as the cardiac condition detection unit 10, and the subject's pulse rate and blood oxygen saturation degree, which are obtained from the SpO2 extraction unit 44 and the pulse rate extraction unit 45 as the arterial blood measurement unit 11, to the optimum torque adjustment unit 15 for the motion assisting unit 4.

Consequently, the motion assisting unit 4 can adjust the hybrid ratio of the voluntary control and the autonomous control on the basis of the subject's heart rate and electrocardiogram changes and the subject's pulse rate and blood oxygen saturation degree.

(4) Actions by this Embodiment

With the heart rehabilitation support apparatus 1 in this embodiment having the above-described configuration, while the subject uses the bicycle ergometer 2 and performs the pedaling motion in the seated state, the motion assisting unit 4 performs the voluntary control of the load torque of the drive unit 8 so as to generate the running torque and the rotational speed of the crank 7 according to the subject's intention and performs the autonomous control of the load torque of the drive unit 8 so as to generate the assisting power for the subject's pedaling motion on the basis of the rotation angle of the crank 7.

Under this circumstance, the motion assisting unit 4: adjusts the hybrid ratio of the voluntary control and the autonomous control with respect to the load torque of the drive unit 8 on the basis of the subject's heart rate and electrocardiogram changes and the subject's pulse rate and blood oxygen saturation degree which are obtained from the biological activity detection unit 3; and can thereby perform the exercise for the functional recovery of the heart while always adjusting the exercise load to an optimum state according to the subject's heart condition without letting the subject excessively increase the exercise load according to the pedaling motion of the bicycle ergometer 2.

Furthermore, the motion assisting unit 4 controls the load torque of the drive unit 8, by means of the voluntary control and the autonomous control respectively, so that the subject's heart rate is always maintained within an appropriate range. Therefore, when the subject is performing the pedaling motion and their own heart rate is about to exceed the appropriate range, the motion assisting unit 4 can perform the control to increase the load torque of the drive unit 8 and reduce the pedal rotation frequency at the same time; and when the subject's own heart rate is about to fall below the appropriate range, the motion assisting unit 4 can perform the control to decrease the load torque of the drive unit 8 and increase the crank rotational frequency at the same time.

As a result, the subject can do exercise for the functional recovery of their heart without making the heart rate increase or decrease excessively unconsciously.

(5) Other Embodiments

Incidentally, the aforementioned embodiment has described the case where the biological activity detection unit 3 having the configuration illustrated in FIG. 4 is applied; however, the present invention is not limited to this example and a concentration of carbon dioxides contained in the subject's exhaled gas may be detected and the detection result may be added to the adjustments of the hybrid ratio of the voluntary control and the autonomous control.

Figure 5:
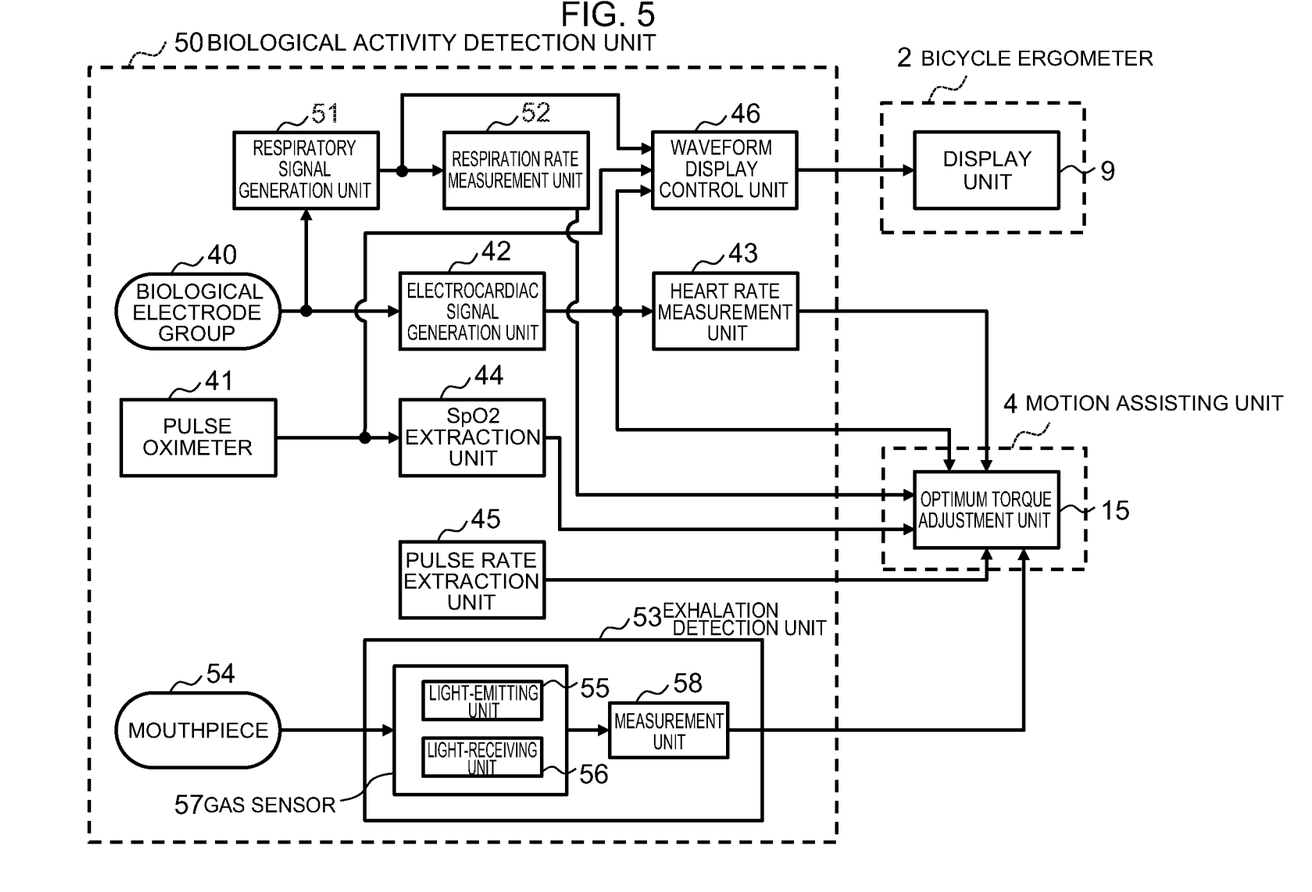
FIG. 5 is a block diagram illustrating the configuration of the biological activity detection unit according to another embodiment.

Referring to FIG. 5, a biological activity detection unit 50 includes a respiratory signal generation unit 51 and respiration rate measurement unit 52 for detecting the subject's respiration rate, and an exhalation detection unit 53 for detecting the concentration of carbon dioxides contained in the exhaled gas of each breath of the subject.

The respiratory signal generation unit 51 passes a small high-frequency current between the biological electrode groups 40 which are attached to the right and left sides of the precordial region, measures an electric potential difference between them, and generates a respiratory signal by recognizing movements of the subject's thorax as changes in impedance of the thorax on the basis of the measurement results.

The respiration rate measurement unit 52 measures the subject's respiration rate on the basis of the respiratory signal obtained from the respiratory signal generation unit 51 and generates data indicating the respiration rate. The waveform display control unit 46 obtains waveform information representing the subject's respiration waveform by applying specified display processing including synchronization processing to the respiratory signal, which is input from the respiratory signal generation unit 51, and outputs the waveform information to the display unit 9 for the bicycle ergometer 2.

The exhalation detection unit 53 includes: a gas sensor 57 composed of a light-emitting unit 55 which emits infrared light to a passage for making the subject's respiratory air flow through a mouthpiece 54 held between the subject's teeth, and a light-receiving unit 56 which receives the infrared light emitted by the light-emitting unit 55; and a measurement unit 58 that measures the concentration of carbon dioxides contained in the subject's exhaled gas on the basis of an electric signal which is output from the gas sensor.

Generally, when the subject does exercise to gradually increase the exercise intensity, the degree of exercise intensity is judged with reference to an anaerobic metabolism threshold (AT: Anaerobic Threshold) which is a change point at which oxygen supply to the muscles makes a transition from a sufficient state to an insufficient state. Specifically speaking, the anaerobic metabolism threshold: corresponds to the upper limit exercise intensity of aerobic exercise because it means that the oxygen is sufficient; and coincides with a physiological change point where, for example, an increase in an amount of carbon dioxide emission exceeds an increase in an amount of oxygen intake.

Accordingly, with the heart rehabilitation support apparatus 1, the biological activity detection unit 50 detects the carbon dioxides contained in the subject's exhaled gas, so that the motion assisting unit 4 thereby judges the degree of the exercise intensity according to the subject's anaerobic metabolism threshold and adjusts the hybrid ratio of the voluntary control and the autonomous control together with the subject's heart rate and electrocardiogram changes and the subject's pulse rate and blood oxygen saturation degree.

Consequently, with the heart rehabilitation support apparatus 1, the subject can do the exercise for the functional recovery of the heart by always adjusting the exercise load to the optimum state according to the subject's heart condition without excessively increasing the exercise load according to the pedaling motion of the bicycle ergometer 2.

Furthermore, this embodiment has described the case where the bicycle ergometer as illustrated in FIG. 1 is applied as the instrument for imparting an arbitrary exercise load to the subject; however, the present invention is not limited to this example and stationary-type or elliptical (cross-trainer) type bicycle ergometers other than the recumbent type may be used or a rowing machine and/or a treadmill may be further applied as long as the functional recovery of the subject's heart after the cardiovascular disease treatment can be supported by the subject's exercise.

REFERENCE SIGNS LIST

1: heart rehabilitation support apparatus
2: bicycle ergometer
3, 50: biological activity detection unit
4: motion assisting unit
5: saddle part
6: pedals
7: crank
8: drive unit
9: display unit
10: cardiac condition detection unit
11: arterial blood measurement unit
12: biological signal detection unit
13: voluntary control unit
14: autonomous control unit
15: optimum torque adjustment unit
20: power amplification unit
21: crank rotation state detection unit
22: joint angle estimation unit
23: relative force detection unit
24: control apparatus
25: driving torque estimation unit
26: joint torque estimation unit
27: muscle torque estimation unit
28: data input unit
29: data storage unit
30: calibration unit
31: parameter identification unit
32: control unit
33: data output unit
34: condition quantification unit
35: signal processing unit
40: bioelectrode
41: pulse oximeter
42: electrocardiac signal generation unit
43: heart rate measurement unit
44: SpO2 extraction unit
45: pulse rate extraction unit
46: waveform display control unit
51: respiratory signal generation unit
52: respiration rate measurement unit
53: exhalation detection unit
54: mouthpiece
55: light-emitting unit
56: light-receiving unit
57: gas sensor
58: measurement unit

The invention claimed is:

1. A heart rehabilitation support apparatus for supporting functional recovery of a heart of a subject after a cardiovascular disease treatment, the heart rehabilitation support apparatus comprising:
a bicycle ergometer comprising:
pedals configured to be pushed by the subject in a seated state;
a crank to which pedals are attached; and
a drive unit that imparts load torque, as an arbitrary exercise load, upon rotation of the crank according to a pedaling motion of the subject;
a muscle potential detector that detects a muscle potential from lower limb parts of the subject generated by the subject by pushing the pedals while the drive unit imparts the arbitrary exercise load according to the pedaling motion of the subject and creates biological signal data;

a plurality of biological electrodes that detect a heart rate and an electrocardiogram change of the subject;

a pulse oximeter that measures a pulse rate and a blood oxygen saturation degree of the subject; and a control apparatus operatively communicating with the drive unit, wherein the control apparatus:

calculates a target motion equation using known dynamics parameters, first data, second data, and third data, wherein the first data is driving torque estimated data generated by the drive unit, the second data is joint torque estimated data of each knee joint and each hip joint of the subject, the third data is joint angle data of each knee joint and each hip joint of the subject;

identifies unknown dynamics parameters using the target motion equation, the first data, the second data, the third data, and fourth data, wherein the fourth data is muscle torque data which is determined using a muscle strength generated by the subject based on the first data;

repeats identification of the unknown dynamics parameters a plurality of times to create identified dynamics parameters;

averages the identified dynamics parameters into an identification parameter;

calculates fifth data, which is a ratio of the biological signal data and the fourth data;

receives a predetermined set muscle gain;

determines if the predetermined set muscle gain is outside of an error range, and on a condition that the predetermined set muscle gain is outside of the error range, corrects the biological signal data into corrected biological signal data and updates the fifth data to corrected fifth data, which is a ratio of the corrected biological signal data and the fourth data;

performs a first control of the load torque of the drive unit by controlling the drive unit, using a control signal, to generate a running torque and a rotational speed according to an intention of the subject determined based on at least the biological signal data, wherein the control signal is based on the first data, the second data, the third data, the identification parameter, and the corrected biological signal data;

performs an autonomous control of the load torque of the drive unit by controlling the drive unit to generate assisting power for the pedaling motion of the subject based on a rotation angle of the crank; and adjusts a hybrid ratio of the first control and the autonomous control based on the heart rate and the electrocardiogram change of the subject detected by the plurality of biological electrodes and the pulse rate and the blood oxygen saturation degree measured by the pulse oximeter.

2. The heart rehabilitation support apparatus according to claim 1, further comprising: an exhalation detection unit that detects a concentration of carbon dioxides contained in an exhaled gas of the subject, wherein the exhalation detection unit includes a gas sensor and a carbon dioxide detector, and wherein the control apparatus adjusts the hybrid ratio of the first control and the autonomous control based on the heart rate, the electrocardiogram change, the pulse rate, the blood oxygen saturation degree, and the concentration of carbon dioxides.

3. The heart rehabilitation support apparatus according to claim 1, wherein the control apparatus performs the first control and the autonomous control of the load torque of the drive unit such that the heart rate of the subject is always maintained within an appropriate range.

4. The heart rehabilitation support apparatus according to claim 1, further comprising:

a synchronous video display unit that is provided within a field of vision of the subject in the seated state at the bicycle ergometer and displays a video which changes in synchronization with the pedaling motion of the subject.

5. The heart rehabilitation support apparatus according to claim 1, wherein the biological signal data is the muscle potential of the subject according to the muscle strength generated by the subject.

6. A heart rehabilitation support method for supporting functional recovery of a heart of a subject after a cardiovascular disease treatment using a bicycle ergometer for imparting an arbitrary exercise load according to a pedaling motion of the subject in a seated state, wherein the bicycle ergometer comprises pedals configured to be pushed by the subject, a crank to which pedals are attached and a drive unit, the method comprising:

imparting, by the drive unit, load torque, as the arbitrary exercise load, upon rotation of the crank;

detecting, by a muscle potential detector and while imparting the arbitrary exercise load according to the pedaling motion of the subject, muscle potential from lower limb parts of the subject generated by pushing the pedals and creating biological signal data;

calculating, by a control apparatus, a target motion equation using known dynamics parameters, first data, second data, and third data, wherein the first data is driving torque estimated data, the second data is joint torque estimated data of each knee joint and each hip joint of the subject, the third data is joint angle data of each knee joint and each hip joint of the subject;

identifying, by the control apparatus, unknown dynamics parameters using the target motion equation, the first data, the second data, the third data, and fourth data, wherein the fourth data is muscle torque data which is determined using a muscle strength generated by the subject based on the first data;

repeating, by the control apparatus, the identification of the unknown dynamics parameters a plurality of times to create identified dynamics parameters, and;

averaging, by the control apparatus, the identified dynamics parameters into an identification parameter, calculating, by the control apparatus, fifth data, which is a ratio of the biological signal data and the fourth data;

obtaining, by the control apparatus, a predetermined set muscle gain, determining, by the control apparatus, if the predetermined set muscle gain is outside of an error range, and on a condition that the predetermined set muscle gain is outside of the error range, correcting the biological signal data into corrected biological signal data and updating the fifth data to corrected fifth data, which is a ratio of the corrected biological signal data and the fourth data;

performing, by the control apparatus, a first control of the load torque of the drive unit by controlling the drive unit, using a control signal, to generate a running torque and a rotational speed according to an intention of the subject determined based on at least the biological signal data,
    wherein the control signal is based on the first data, the second data, the third data, the identification parameter, and the corrected biological signal data;
performing, by the control apparatus, an autonomous control of the load torque of the drive unit by controlling the drive unit, based on a rotation angle of the crank, to generate assisting power for the pedaling motion of the subject; and
adjusting, by the control apparatus, a hybrid ratio of controlling the drive unit in the first control and in the autonomous control based on a heart rate, an electrocardiogram change, a pulse rate and a blood oxygen saturation degree of the subject determined.

7. The heart rehabilitation support method according to claim 6,
    wherein the hybrid ratio is further adjusted based on a determined concentration of carbon dioxides contained in an exhaled gas of the subject.

8. The heart rehabilitation support method according to claim 6,
    wherein the first control and the autonomous control of the load torque of the drive unit are performed such that the heart rate of the subject is always maintained within an appropriate range.

9. The heart rehabilitation support method according to claim 6,
    further comprising: displaying, on a video display unit within a field of vision of the subject in the seated state at the bicycle ergometer, a video which changes in synchronization with the pedaling motion of the subject.

10. The heart rehabilitation support method according to claim 6,
    wherein the biological signal data is the muscle potential of the subject according to the muscle strength generated by the subject.

* * * * *